March 30, 1943. G. W. WILLARD 2,314,960
METHOD OF AND APPARATUS FOR PRODUCING TELEVISION IMAGES
Filed March 11, 1941 7 Sheets-Sheet 1

FIG. 1

INVENTOR
G. W. WILLARD
BY
*C. G. Sprague*
ATTORNEY

FIG. 3

March 30, 1943.                G. W. WILLARD                2,314,960
                METHOD OF AND APPARATUS FOR PRODUCING TELEVISION IMAGES
                    Filed March 11, 1941          7 Sheets-Sheet 5

INVENTOR
G. W. WILLARD
BY
ATTORNEY

March 30, 1943. G. W. WILLARD 2,314,960
METHOD OF AND APPARATUS FOR PRODUCING TELEVISION IMAGES
Filed March 11, 1941 7 Sheets-Sheet 6

INVENTOR
G. W. WILLARD
BY
ATTORNEY

Patented Mar. 30, 1943

2,314,960

UNITED STATES PATENT OFFICE 2,314,960

METHOD OF AND APPARATUS FOR PRODUCING TELEVISION IMAGES

Gerald W. Willard, Fanwood, N. J., assignor to Bell Telephone Laboratories, Incorporated, New York, N. Y., a corporation of New York Application March 11, 1941, Serial No. 382,697

26 Claims. (Cl. 178—6)

This invention relates to signaling and particularly to a method of and apparatus for producing television images upon a viewing screen.

An object of the invention is to improve the operating characteristics of an image producing system employing a light modulating device of the supersonic type.

In accordance with the invention, a television image is built up upon an image screen along substantially parallel lines under control of an image electromotive force by projecting light upon the screen to illuminate simultaneously all the elemental areas of a line, interrupting the illumination of the elemental areas one at a time in succession and at the same time illuminating the elemental areas one at a time in succession of a succeeding scanning line in synchronism with the interruption of the illumination of the elemental areas of the first line and electrically controlling the illumination of each of the elemental areas in accordance with the tone values of the corresponding elemental areas of a field of view of which an image is to be produced.

In accordance with the embodiment of the invention specifically shown and described herein for the purpose of illustration, there is provided for modulating a light beam under control of a source of television electromotive force, a supersonic light valve, for example, a valve such as is disclosed in my Patent No. 2,287,587 granted June 23, 1943, on an application filed November 2, 1939. There is applied to the piezoelectric driver of the supersonic cell for setting up compressional waves in the liquid thereof a high frequency alternating electromotive force modulated in accordance with the variations of a television electromotive force produced as the result of scanning the elemental areas of a field of view in succession along successive parallel scanning lines. An optical system is provided for projecting upon a viewing screen an image of the supersonic cell, or of the effective light aperture thereof, which image is enlarged along the dimension corresponding to the length of the supersonic cell in the direction of propagation of compressional waves through the cell and which image is compressed along the dimension corresponding to the width of the cell perpendicular to the direction of propagation of the compressional waves. As the result of impressing upon the piezoelectric driver of the supersonic cell an electric wave the amplitude of which varies in accordance with the tone value of successively scanned elemental areas of a field of view, there is set up in the liquid of the cell a compressional wave the amplitude of which varies in accordance with the amplitude variations of the electric wave. The compressional wave is propagated through the cell at a certain velocity, determined by the characteristics of the liquid in the cell, and is absorbed at the end of the cell opposite the end at which the piezoelectric driver is positioned. At any instant a portion of the compressional wave having a compression and a rarefaction or having a plurality of compressions and rarefactions, corresponds to and has an amplitude representative of the tone value of a certain elemental area of the field of view which is scanned at the transmitter and this portion of the wave is initiated at the driver end of the cell and travels at a certain velocity to the opposite end. The cell, and also its effective light aperture, is made sufficiently long that at any instant there will be represented by the compressional wave in the cell as many elemental areas as there are elemental areas in a scanning line. Differently stated, the time required for the propagation of a compressional wave through the effective light modulating area of the cell is equal to the time required for scanning a line of elemental areas of the field of view an image of which is to be produced. At a given instant, therefore, light will be projected upon the image producing screen to illuminate all of the elemental areas of a line each in accordance with the tone value of the corresponding elemental area of the field of view which is being scanned at the transmitting station.

There are provided in the optical path between the supersonic light valve and the viewing screen a high speed mirror drum and a low speed mirror drum for deflecting the light rays coming from the supersonic cell. The high speed mirror drum is a double mirror drum having two sets of mirror faces positioned about an axis of rotation and bounded by different pairs of planes perpendicular to the axis, respectively. The mirror faces are inclined at different angles with respect to the axis, respectively. The intersection line of a mirror face of one drum of the double mirror drum with a plane perpendicular to the axis and the intersection lines of two adjacent mirror faces of the other drum of the double mirror drum with a plane perpendicular to the axis lie in intersecting planes parallel to the axis. Both drums of the double mirror drum are simultaneously in the light path. At certain times only light reflected from one mirror face of the double or high speed drum reaches the viewing screen but during most of the scanning time light reflected from two mirror faces, intersected by different planes perpendicular to the drum axis, respectively, reaches the screen simultaneously. As the double mirror drum revolves, it serves to maintain in its proper position in a scanning line on the screen the light rays which are modulated due to the action of that portion of the compressional wave propagated through the supersonic cell which is representative of the corresponding elemental area of the field of view. After an entire line of elemental areas of the image has been produced upon the viewing screen due to light reflected from a mirror face of the double mirror drum, these elemental areas are obliterated one at a time in succession and at the same time the elemental areas of the succeeding line are produced one at a time in succession due to light reflected from a mirror face of the other drum of the double mirror drum. If there are twenty mirror faces on the double mirror drum, for example, light will be reflected from these mirror faces during one revolution of the double mirror drum to one of the faces of the low speed mirror drum and thence to the screen for reproducing twenty lines of the image. During the next revolution of the high speed drum, the reflected light will reach a succeeding face of the low speed drum and be reflected therefrom to the screen to reproduce the next twenty lines of the image. If each image is to have 440 lines, for example, the high speed drum may have twenty faces and the low speed drum twenty-two faces and the high speed drum will revolve at a speed which is twenty-two times that of the low speed drum.

The invention will now be described in connection with the accompanying drawings in which.

Referring now to the drawings, there is provided a source of television image current 21 which is generated by a television transmitting apparatus as a result of scanning the elemental areas in succession along successive parallel, linear paths of a field of view. The current from the source 21 is impressed upon a modulator 22 along with current from high frequency source 122 to produce a high frequency alternating electromotive force modulated in accordance with the tone values of successively scanned elemental areas of a field of view and this electromotive force, after being amplified in amplifier 23, is impressed upon the electrodes of the piezoelectric driver 24 of a supersonic cell 25 which is filled with a suitable liquid 26. While source 21 may include synchronizing signals, if desired, such synchronizing signals are not required for the operation of the apparatus.

Figure 1:
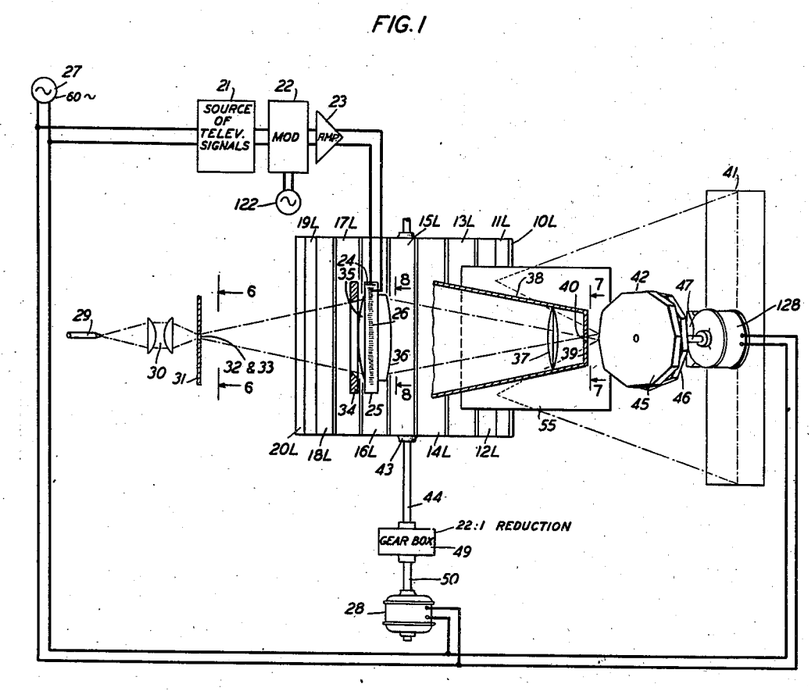
Fig. 1 is a plan view, partly in schematic, of a television image producing apparatus in accordance with the present invention.

At the television transmitter, the scanning of the field of view may be maintained in synchronism with a 60-cycle power source as disclosed, for example, in an article by A. V. Bedford and John Paul Smith, in RCA Review for July 1940 (published by RCA Institutes Technical Press, 75 Varick Street, New York, N. Y.), starting on page 51. As shown diagrammatically in Figs. 1 and 3, the television generating apparatus 21 is connected to the 60-cycle power source 27 and the synchronous motors 28 and 128 which drive the rotating scanning apparatus of the image producer is also connected to the 60-cycle power source 27 so that the apparatus of the image producer may be maintained in proper synchronism with the scanning at the transmitter.

Figure 6:
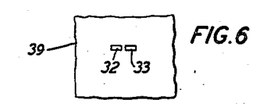
Fig. 6 is a detail view taken along the line 6—6 of Figs. 1 and 4.
Figure 7:
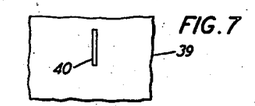
Fig. 7 is a detail view taken along the line 7—7 of Figs. 1 and 4.

Light from a high intensity source 29, for example, a mercury vapor discharge lamp, passes through the condenser lens 30 which directs the light in a concentrated beam upon that portion of opaque screen 31 which has therein small light transmitting apertures 32 and 33 as shown in Fig. 6. The transmitted light beam thence passes through the opening in plate 34 which defines the useful light aperture of the supersonic cell, through spherical lens 35, through the liquid of supersonic cell 25, through double cylindrical lens 36 and through cylindrical lens 37 which is mounted in lens housing 38. The undiffracted light is intercepted by the end plate 39 of the lens housing 38 while the portion of the light beam which is diffracted by the action of the compressional wave set up in the liquid 26 due to the vibration of the piezoelectric crystal element 24 of the supersonic cell passes through the slit 40 in plate 39 as shown in Fig. 7. The light beam is thence directed to the translucent viewing screen 41, of ground glass, for example, by reflection from the faces of the high speed double mirror drum 42 and the faces of the low speed mirror drum 43.

Figure 8:
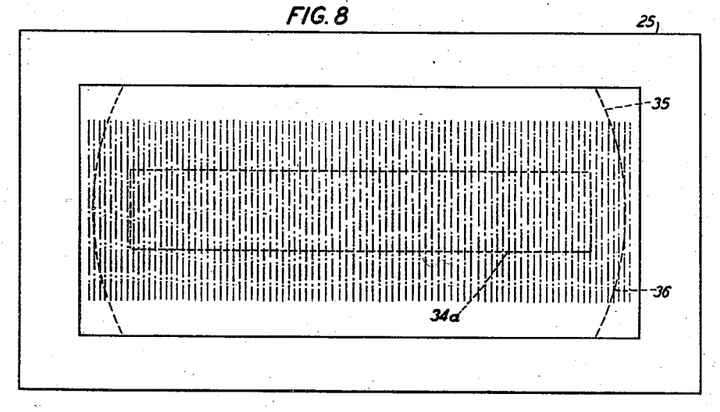
Fig. 8 is a detail view taken along the line 8—8 of Figs. 1 and 4.
Figure 9:
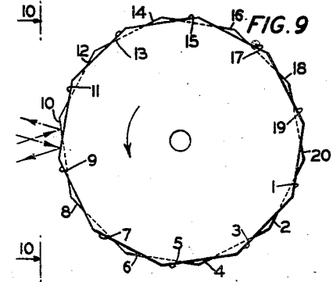
Fig. 9 is an enlarged view taken along the line 9—9 of Fig. 2.

The low speed mirror drum 43 mounted on shaft 44 has twenty-two faces designated 1L to 22L, inclusive, the reflecting surfaces of which lie in planes substantially parallel to the axis of rotation and at different angles, respectively, with respect to a fixed line intersecting the surfaces in succession as the surfaces pass through the light beam coming from the high speed mirror drum, for example a line extending perpendicularly from the center of viewing screen 41. The high speed drum 42 comprises two mirror drums 45 and 46 mounted on a shaft 47, the drum 45 comprising mirror faces 1, 3, 5, 7, 9, 11, 13, 15, 17 and 19 and the drum 46 comprising mirror faces 2, 4, 6, 8, 10, 12, 14, 16, 18 and 20 as shown in Fig. 8. In planes perpendicular to the axis, the angle formed by any two adjacent mirror surfaces of drum 45 or of drum 46 is 144 degrees. The two drums are so oriented on the shaft 47 that a plane including the axis and the line of intersection of two adjacent mirror faces of one drum bisects a mirror surface of the other drum. The inclination of the mirror faces of high speed drum 42 with respect to its axis of rotation is such that, when the mirror drum is rotated through one complete revolution, light from the mirror surfaces 1 to 20, respectively, in order, reaches successive parallel lines of the image producing screen.

The motor 128 drives the high speed mirror drum 42 through the shaft 47 and the motor 28 drives the low speed mirror drum 43 through gear box 49 the gears of which have a ratio of 22 to 1 and the shafts 44 and 50. Thus the high speed drum 42 makes a complete revolution while the low speed mirror drum 43 makes $\frac{1}{22}$ revolution. Therefore, a group of twenty lines of the image are produced upon the screen 41 by light reflected from the twenty faces of high speed mirror drum 42 and, after passing through cylindrical lens 55, reflected from one of the faces 48 of the low speed mirror drum 43. The following group of twenty lines of the image is similarly produced upon the screen 41 by light reflected from the twenty faces of high speed drum 42 and from the face of the low speed mirror drum which next enters the light beam reflected from the high speed mirror drum. The faces of the low speed mirror drum, as they successively pass through the incident light beam from lens 55, are so inclined with respect to a perpendicular line drawn to the center of the screen 41 that each group of twenty lines of the image produced upon screen 41 is displaced with respect to the preceding group of twenty lines by the space occupied by twenty lines. For example, the twenty-first line occupies the same position with respect to the twentieth line as the second line occupies with respect to the first line.

Figure 14:
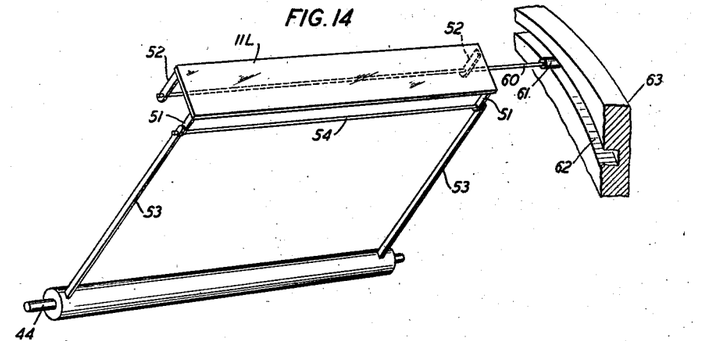
Figs. 14 and 15 are detail views showing the means for guiding the mirrors of the low speed mirror drum shown in Figs. 1 and 2.
Figure 15:
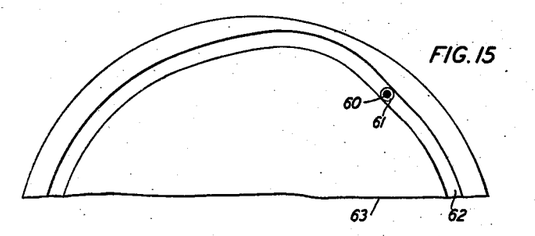

As may be seen from the detailed views in Figs. 14 and 15, each mirror face, 11L for example, of the low speed drum 43 is mounted upon a support having a pair of legs 51 at the leading portion of the mirror as the drum 43 rotates and a pair of legs 52 at the following portion of the mirror. A pair of spokes 53 are secured at one end to the shaft 44 and at the other end to a rod 54 upon which the legs 51 are pivotally mounted. The pair of legs 52 are pivotally mounted upon a rod 60 at one end of which is mounted a roller 61, the roller 61 riding in a slot 62 in guide member 63. The portion of the slot 62 in which the roller 61 rides during the time that its associated mirror intercepts and reflects the light beam coming from the high speed mirror drum 42 and passing through lens 55 is so shaped that the mirror surface moves in a single plane and thus the inclination of the mirror surface with respect to a perpendicular drawn to the center of the viewing screen remains fixed during this time interval. However, different mirror faces have different inclinations, respectively, with respect to the perpendicular drawn to the center of the viewing screen while intercepting and reflecting the light beam so that successive mirror faces will direct light to different portions of the screen 41 respectively. Thus, the mirror face 1L will reflect the incident light at such an angle that the first twenty lines at the top of the image will be produced upon the screen 41 during a single complete revolution of the high speed drum 42 and the mirror face 2L next entering the incident light beam will reflect the light to such a position on screen 41 that lines 21 to 40 of the image will be produced upon the screen at the correct position just below the first twenty lines. Light reflected from mirror 22L will produce the last group of twenty lines of the image on the screen, that is, lines 421 to 440, and then mirror face 1L again enters the light beam to cause lines 1 to 20 of a succeeding image to be produced upon the screen during a single complete revolution of the high speed mirror drum 42. The mirrors 1L to 22L, as they successively intercept and reflect the light beam, are tilted at progressively increasing angles with respect to the plane of mirror face 1L. The angle of tilt of one of the mirrors 1L to 22L, inclusive, may be increased by effectively rotating the mirror faces about its longitudinal axis, that is, by reducing the effective length of legs 51 and correspondingly increasing the effective length of legs 52.

Figure 4:
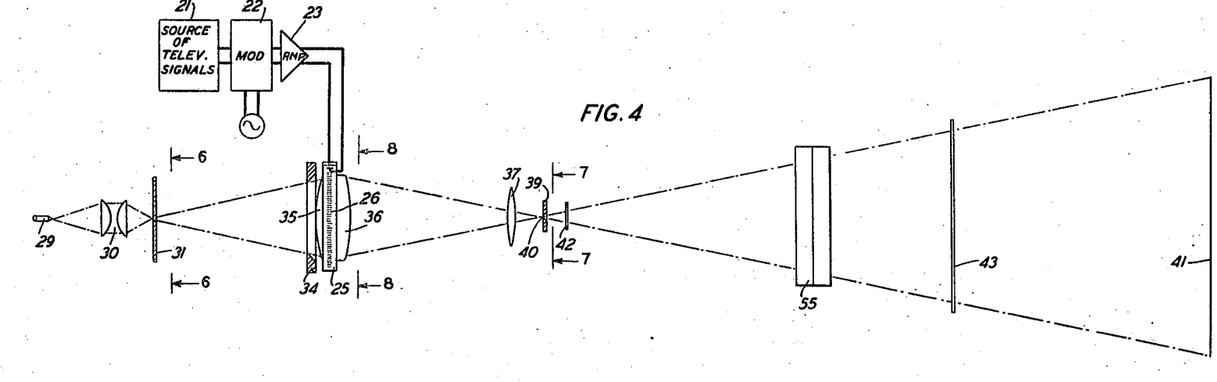
Fig. 4 is a simplified schematic view of the apparatus as shown in Fig. 1.
Figure 5:
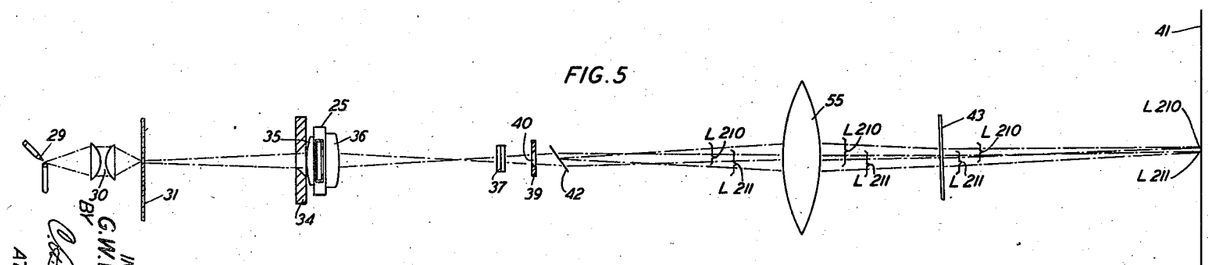
Fig. 5 is a simplified schematic view of the apparatus as shown in Fig. 2.

Considering now the optical diagrams of Figs. 4 and 5, light from source 29 is concentrated upon the portion of screen 31 which has therein the two apertures 32 and 33 (Fig. 6) and the transmitted light beam passes through the opening in screen 34, lens 35 and supersonic cell 25. The area of the supersonic cell 25 through which light is transmitted as defined by the opening in the screen 34 is shown by the dash line 34a in Fig. 8. Lens 35 causes the light to pass through the supersonic cell in a direction substantially parallel to the wave fronts of the compressional wave which is propagated through the liquid of the cell in the direction indicated by the arrow in Fig. 8.

In the plane of Fig. 4 spherical lens 35, double cylindrical lens 36 and cylindrical lens 37 produce an image of the screen 31 upon the screen 39 so that, when there are no compressional waves in the liquid of the supersonic cell 25, light transmitted through the openings 32 and 33 of screen 31 will impinge upon the opaque portion of screen 39 at the sides of the slit 40 (Fig. 6) and no light will pass through the slit 40. However, when the light is diffracted due to a compressional wave propagated through the supersonic cell 25, light will pass through the slit 40 and reach the image producing screen 41. The lens 37 focusses an image of the supersonic cell upon the screen 41 so that a light ray passing through the upper portion of cell 25, for example, will reach the lower portion of screen 41, as viewed in Fig. 4, when the mirror drum 41 is in a certain position.

In the plane of Fig. 5, the light rays incident upon lens 36 are brought to a focus before reaching the screen 39 and the diverging beam passes through slot 40 in screen 39 and reaches the mirror drum 42. The divergent light beam reflected from the mirror drum 42 reaches cylindrical lens 55 which directs the light in a convergent beam upon mirror drum 43 from which it is reflected to screen 41. Therefore, at an instant when only light from one of the faces of mirror drum 42 reaches screen 41 there will be produced upon the screen a single line of light, the intensity of different elemental areas of which corresponds to the amplitude of the compressional waves at the corresponding portions of the supersonic cell.

Figure 13:
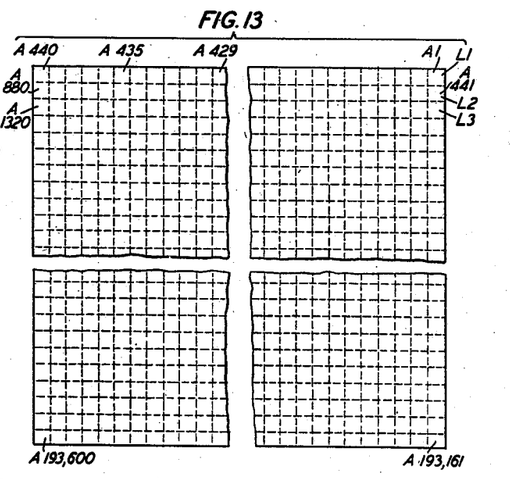
Fig. 13 is a detail view taken along the line 13—13 of Fig. 2.

Let us now designate the lines which are scanned in succession at the transmitter as L1, L2, L3, etc. and designate the elemental areas which are scanned in succession at the transmitter as A1, A2, A3, etc., starting at the upper right-hand corner of the field of view, and assume that there are 440 elemental areas in each line. Then the positions occupied by the corresponding elemental areas and lines upon the viewing screen 41 are as indicated in Fig. 13.

Figure 10:
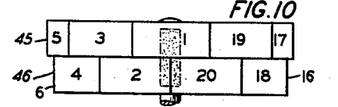
Figs. 10, 11 and 12 are views taken along the line 10—10 of Fig. 9 for different positions, respectively, of the mirror drum shown in Fig. 9 as the drum is rotated about its axis.
Figure 16:
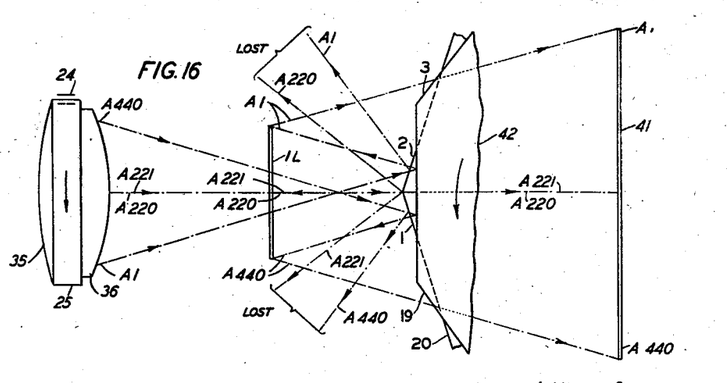
Figs. 16 to 21, inclusive, are diagrams to which reference will be made explaining the operation of the system.
Figure 19:
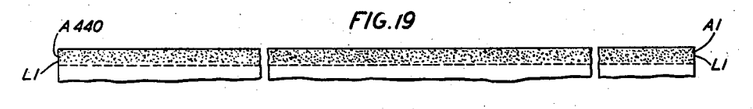

Referring now particularly to Figs. 10, 16 and 19, it is apparent that when a television image signal is impressed upon the piezoelectric driver 24 to set up a compressional wave in the liquid of the supersonic cell, the compressional wave corresponding to a certain elemental area, A1, for example, will start at the end of the cell near the piezoelectric driver 24 and will be propagated toward the opposite end of the cell where it is absorbed. As depicted in Fig. 16, if there are 440 elemental areas in line L1, for example, at a certain instant there will be present in that portion of the liquid of the supersonic cell through which light is directed compressional waves corresponding to elemental areas A1 to A440, inclusive, the wave corresponding to element A440 being near the end of the cell at which the driver 24 is located and the wave corresponding to elemental area A1 being at that time near the opposite end of the cell. The velocity of the compressional wave in the liquid of the cell is such that it travels through the useful portion of the cell in one line scanning period. At this time, as shown in Fig. 10, one-half the light beam coming from the cell 25 is incident upon the mirror face 1 of drum 42, one-quarter on mirror face 2, and one-quarter on mirror face 20. The light reflected from mirror face 1 strikes a mirror face 1L of the low speed mirror drum and is reflected therefrom to the viewing screen 41 where the first line L1 comprising elemental areas A1 to A440, inclusive, is reproduced as indicated in Figs. 16 and 19. The light reflected from mirror faces 2 and 20 does not reach the mirror face 1L of the low speed mirror drum and therefore is not reflected therefrom to illuminate the viewing screen 41.

It should here be noted that the mirror drum 42 is so positioned in the light path that, due to its rotation, the illuminated elemental areas on the screen remain in fixed position. For example, as the compressional wave corresponding to elemental area A1 is propagated through the supersonic cell, the light rays which are diffracted by that portion of the compressional wave are directed to a fixed elemental area of the screen, that is, to the portion of the screen corresponding to elemental area A1 of the image.

Figure 11:
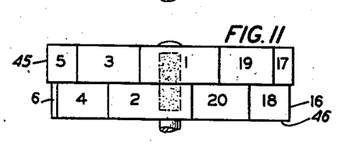
Figure 17:
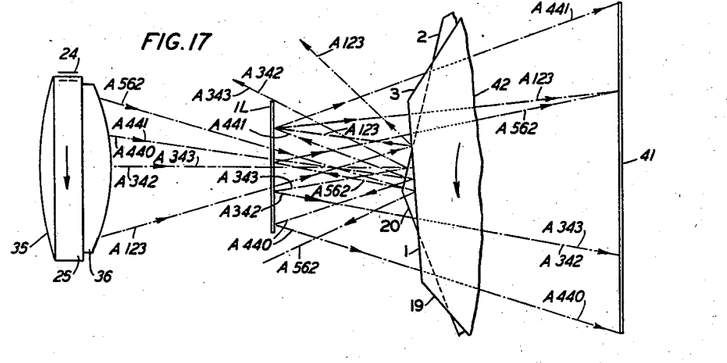
Figure 20:
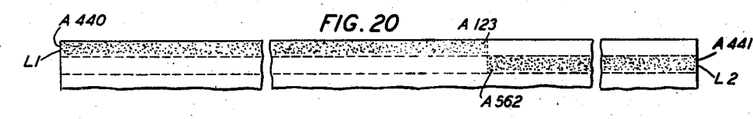

At slightly later instant there will be present in the useful portion of the supersonic cell compressional waves corresponding to a different group of elemental areas. As shown in Fig. 17 there are present in the cell compressional waves corresponding to elemental areas A123 to A562, the waves corresponding to elemental areas A1 to A122, inclusive, having been absorbed or having passed beyond the useful portion of the cell through which light is transmitted. At this time, as shown in Figs. 11 and 17, one-half the light beam incident upon mirror drum 42 is reflected from mirror face 1 and one-half from mirror face 2. The portion of the light beam which is modulated by the compressional wave corresponding to elemental areas A123 to A440, inclusive, and reaching mirror face 1 of drum 42 is reflected to mirror face 1L and thence to viewing screen 41. The portion of the light beam which is modulated by the compressional wave corresponding to elemental areas A441 to A562, inclusive, and reaching mirror face 2 of drum 42 is likewise reflected to mirror face 1L and thence to the viewing screen 41. The portion of the light beam corresponding to elemental areas A123 to A440, inclusive, and reaching mirror face 2 and the portion of the light beam corresponding to elemental areas A441 to A562 and reaching mirror face 1 are reflected at such angles, respectively, that the light beams do not reach the mirror face 1L and the viewing screen 41. At this instant, therefore, elemental areas A123 to A440, inclusive, of line L1 and elemental areas A441 to A562, inclusive, of line L2 are produced upon the viewing screen 41 as depicted in Fig. 20.

Figure 12:
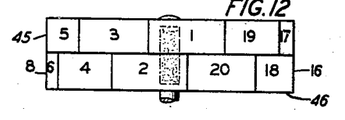
Figure 18:
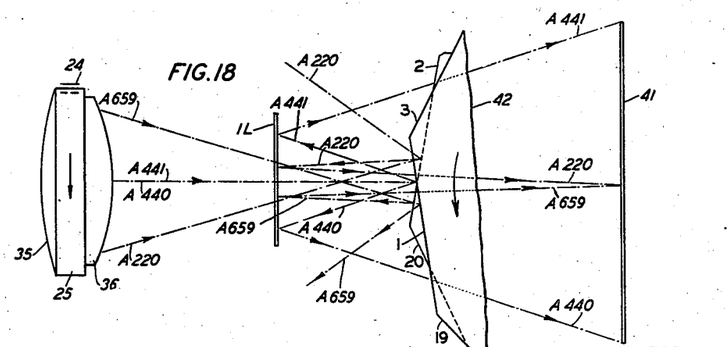
Figure 21:
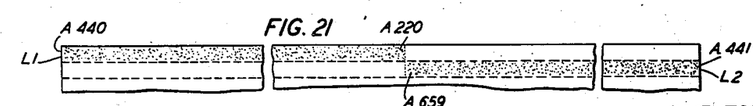

At a slightly later instant the mirror drum 42 reaches the position shown in Figs. 12 and 18. At this time one-half the light beam is incident upon mirror face 1 and one-half upon mirror face 2 and the compressional wave in the supersonic cell is representative of elemental areas A220 to A659. The portion of the light beam representative of elemental areas A220 to A440 reaching mirror face 1 and the portion of the light beam representative of elemental areas A441 to A659 reaching mirror face 2 are reflected to mirror face 1L of the low speed mirror drum and thence to the viewing screen 41. Thus elemental areas A220 to A440 of line L1 and elemental areas A441 to A659 of line L2 are produced as shown in Fig. 21. The portion of the light beam corresponding to elemental areas A220 to A440, inclusive, reflected from mirror face 2 and the portion of the light beam corresponding to elemental areas A441 to A659 reflected from mirror face 1 do not reach the mirror face 1L and the viewing screen.

Figure 2:
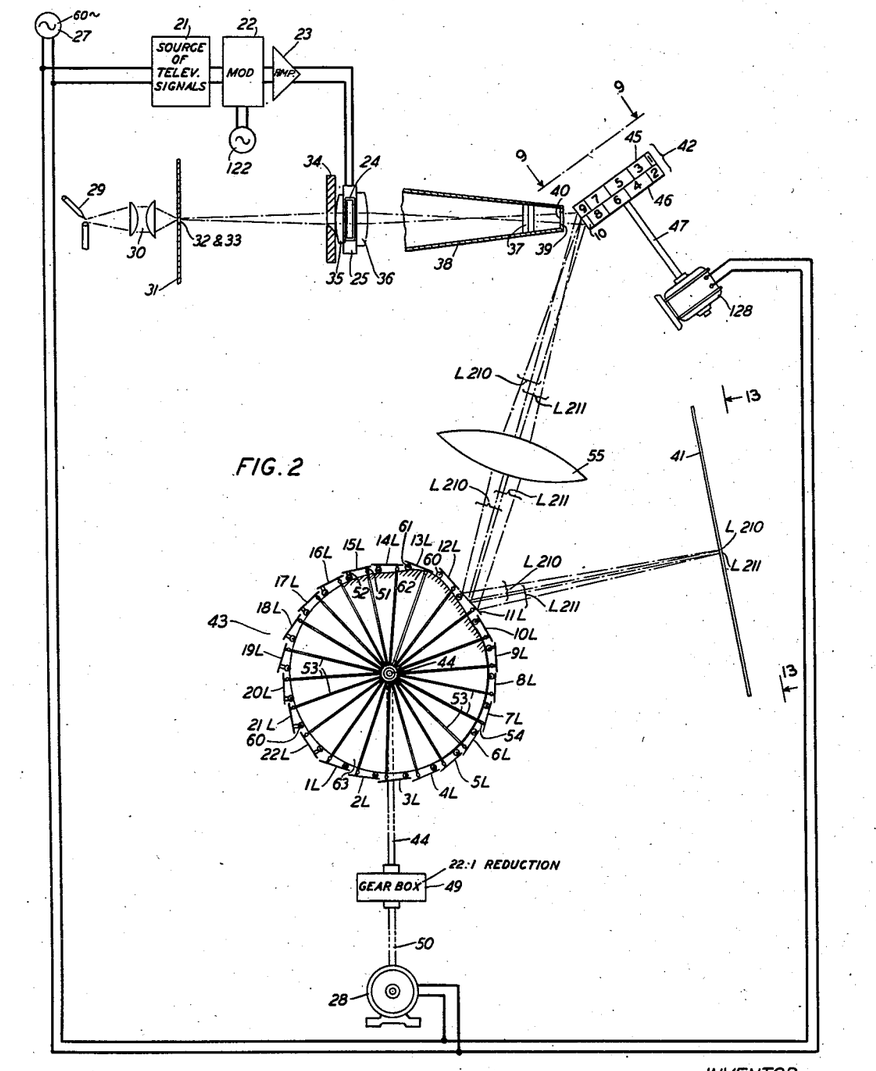
Figs. 2 and 3 are views in side elevation partly in section of the apparatus shown on Fig. 1 for different positions, respectively, of the scanning drums.
Figure 3:
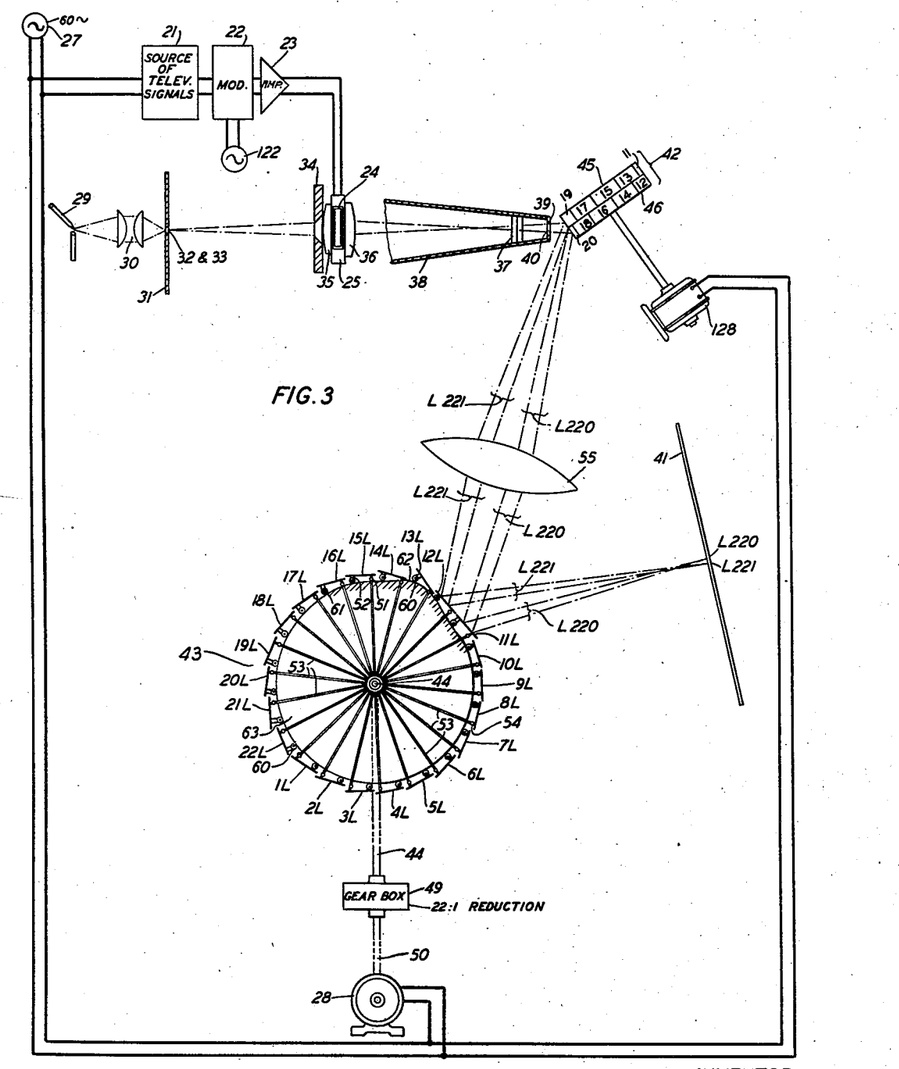

As previously stated, the mirror drum 42 having twenty mirror faces makes a complete revolution while the mirror drum 43 having twenty-two mirror faces makes $1/22$ revolution and, therefore, each group of twenty lines of the image is produced upon the viewing screen 41 by light reflected from one of the mirror faces of the drum 43 while the mirror drum 42 makes one complete revolution. Fig. 2 (and also Fig. 5) depicts a static condition existing when a portion of line L210 is being produced by light reflected from mirror face 10 of drum 42 to a mirror face 11L of drum 43 and when a portion of line L211 is being produced by light reflected from mirror face 11 of drum 42 to the same mirror face 11L of drum 43. Fig. 3 depicts a static condition which exists when a portion of line L220 is produced upon the viewing screen by light reflected from mirror face 20 of mirror drum 42 and thence from mirror face 11L of drum 43 to the screen and when a portion of line L221 is simultaneously produced upon the viewing screen by light reflected from mirror face 1 of high speed drum 42 and thence from the following mirror face 12L, to the viewing screen 41.

It is apparent from the above description that the lines of each group of twenty lines of the image are produced by light reflected from different faces, respectively, of the high speed mirror drum 42 and that the groups of twenty lines each are produced by light reflected from different faces 1L to 22L, respectively, of the low speed mirror drum 43. A television image is thus built up or synthesized under control of a television electromotive force having an amplitude corresponding to the tone value of elemental areas of a field of view scanned one at a time in succession along successive parallel lines by producing simultaneously substantially as many elemental areas of the image as there are elemental areas in a line, the elemental areas of one line of the image progressively decreasing one at a time and the elemental areas of a succeeding line simultaneously progressively increasing one at a time. If desired, moreover, there may be produced simultaneously a plurality of elemental areas of the image less in number than the number of elemental areas in a scanning line, a portion of the simultaneously produced elemental areas lying in one scanning line and the remaining portion lying in a succeeding scanning line at times so that the total number of simultaneously produced elemental areas remains substantially constant. This may be accomplished by shortening the effective length of the supersonic cell in the direction of wave propagation therethrough at one end or at both ends equally. It is more advantageous, however, to produce simultaneously substantially as many elemental areas as there are elemental areas in a single scanning line.

What is claimed is:

1. The method of television image production in which an image is built up on an image screen along successive substantially parallel lines under control of an image electromotive force produced as the result of scanning elemental areas in succession along parallel lines successively of a field of view an image of which is to be produced which comprises producing a light beam, modulating said light beam under control of the electromotive force from said source, projecting said modulated light beam upon the image screen to illuminate simultaneously all the elemental areas of a line, and deflecting said modulated light beam to interrupt the illumination of said elemental areas one at a time in succession and to simultaneously illuminate the elemental areas one at a time in succession of a succeeding scanning line in synchronism with the interruption of the illumination of the elemental areas of said first line.

2. The method of building up a television image along successive substantially parallel lines under control of a television electromotive force which comprises producing a light beam, modulating said light beam under control of said television image electromotive force, projecting said light beam for simultaneously illuminating as many elemental areas of the image field as there are elemental areas in a line, and deflecting said modulated light beam for progressively decreasing the simultaneously effective elemental areas in a line one at a time and simultaneously synchronously increasing the simultaneously effective elemental areas in a succeeding line one at a time.

3. Apparatus for producing television images under control of a source of television image electromotive force comprising a light valve under control of said television image electromotive force, a screen, and means, comprising a plurality of reflecting surfaces lying in intersecting planes and positioned for simultaneously intercepting light from said light valve and for directing the light simultaneously intercepted by said surfaces upon different portions of said screen respectively.

4. Image producing apparatus comprising a source of light, a supersonic light valve for modulating light from said source under control of a television image electromotive force, a viewing screen and a rotatable mirror drum having light reflecting faces a plurality of which have reflecting surfaces positioned in intersecting planes to cause light from said modulated source to be directed simultaneously upon different portions of said viewing screen respectively.

5. Image producing apparatus comprising means for producing a light beam, an image screen, and a rotatable mirror drum having positioned about its axis of rotation mirror faces a plurality of which are simultaneously in the path of said light beam and have reflecting surfaces positioned in intersecting planes for reflecting different portions of said beam in different directions respectively, thereby simultaneously illuminating different portions of said screen by light from different portions of said light beam, respectively.

6. Image producing apparatus comprising a supersonic cell, an image screen, means for directing a light beam through said supersonic cell to cause the light beam to be modulated and means for differently deflecting portions of the emergent light beam from different portions of said supersonic cell respectively, to divide said beam into a plurality of separated beams, thereby causing said differently deflected portions of the light beam to impinge upon different portions respectively of said image screen simultaneously.

7. Television image producing apparatus comprising supersonic light modulating means, means for directing a light beam upon said light modulating means, means for impressing an image electromotive force upon said light modulating means to cause portions of said light beam which are simultaneously acted upon by different portions of said light modulating means respectively to be differently modulated, a viewing screen, and means for directing light from said light modulating means to said viewing screen to cause an image to be produced thereon, said means comprising a plurality of reflecting surfaces in different planes respectively for simultaneously receiving light from said light modulating means and causing said light to be directed to different portions of said viewing screen respectively.

8. The method of image production which comprises producing a light beam, modulating said light beam in accordance with the tone value of successively scanned elemental areas of a field of view, differently directing portions of said modulated light beam to divide it into a plurality of light beams and utilizing said plurality of light beams simultaneously in the production of the image.

9. The method of producing television images on a viewing screen which comprises producing a light beam, modulating different portions of said light beam simultaneously in accordance with the tone values of elemental areas of corresponding portions of a field of view, and differently directing said portions of the modulated light beam to cause the resulting light beams to illuminate simultaneously different portions respectively of the viewing screen.

10. The method of producing television images upon a viewing screen electro-optically which comprises producing a light beam, simultaneously differently modulating different portions of said light beam respectively under control of an electromotive force having variations corresponding to the tone values of successively scanned elemental areas of a field of view an image of which is to be produced, and directing one of said portions of the modulated light beam angularly with respect to another portion to cause desired portions of the viewing screen to be simultaneously illuminated due to the resulting light beams simultaneously impinging thereon.

11. In a television image producing apparatus, means for producing a modulated light beam, a viewing screen, and means for directing said light beam upon said viewing screen comprising a mirror drum in the path of said light beam having a plurality of plane reflecting surfaces positioned about an axis of rotation for reflecting the light incident upon a plurality of said reflecting surfaces simultaneously to cause different portions of said viewing screen to be simultaneously illuminated by light reflected from different reflecting surfaces simultaneously.

12. In a television image producing apparatus, means for producing a modulated light beam, a viewing screen, a mirror drum in the path of said light beam having a plurality of plane reflecting surfaces positioned about an axis of rotation for reflecting the light of said beam incident upon a plurality of said reflecting surfaces simultaneously to said viewing screen to cause different portions thereof to be simultaneously illuminated by light reflected from different reflecting surfaces respectively, and means for rotating said mirror drum about its axis to cause the illumination of a plurality of successive parallel lines of the viewing screen.

13. In a television image producing apparatus, means for producing a modulated light beam, a viewing screen, a first mirror drum in the path of said light beam having a plurality of plane reflecting surfaces positioned about an axis of rotation for reflecting the light incident upon a plurality of said reflecting surfaces simultaneously to said viewing screen to cause different portions thereof to be simultaneously illuminated by light reflected from different reflecting surfaces respectively, means for rotating said first mirror drum about its axis to cause the illumination of a plurality of successive parallel lines of the viewing screen, a second mirror drum having a plurality of plane reflecting surfaces positioned about an axis of rotation for reflecting incident light coming from said first mirror drum to said viewing screen, and means for rotating said second mirror drum about its axis to move the faces of the second mirror drum into the light path successively at the rate of one for each complete revolution of the first mirror drum, each reflecting surface of said second mirror drum having a fixed inclination with respect to the viewing screen while it is in the path of said light beam and successive reflecting surfaces of said second mirror drum having different inclinations respectively with respect to said viewing screen while in the path of the light beam, thereby displacing a group of illuminated lines produced upon said screen during one complete revolution of said first mirror drum with respect to a group of illuminated lines produced upon the viewing screen during a preceding or following complete revolution of said first mirror drum.

14. A mirror drum having a plurality of light reflecting surfaces positioned about an axis of rotation and lying in planes which are differently inclined respectively with respect to the axis, different sets of said reflecting surfaces being bounded by different pairs of planes perpendicular to the axis respectively, a plane including said axis and the intersection line of any two adjacent surfaces of one of said sets substantially bisecting a reflecting surface of the other set.

15. The method of producing television images upon an image screen by illuminating elemental areas thereof lying along successive parallel scanning lines which comprises producing an image modulated light beam and directing different portions of said light beam simultaneously upon elemental areas in different scanning lines respectively of said image screen.

16. Apparatus for producing television images upon a viewing screen comprising a source of electromotive force which varies in accordance with the tone value of elemental areas of a field of view scanned one at a time in succession along substantially parallel scanning lines in succession, and means under control of said electromotive force for producing an image of said field of view upon said viewing screen, said means comprising means for producing a light beam, means under control of the electromotive force of said source for modulating said light beam, means for projecting said modulated light beam for illuminating simultaneously a group of elemental areas corresponding substantially to as many consecutively scanned elemental areas of the field of view as there are elemental areas in a scanning line and means for deflecting said light beam for progressively changing the elemental areas of the group of illuminated elemental areas one at a time without changing the total number of elemental areas which are simultaneously illuminated.

17. The method of producing television images of a field of view upon an image screen under control of an electromotive force produced as the result of scanning the elemental areas one at a time in succession along successive parallel lines of a field of view which comprises directing a modulated light beam upon said image screen for simultaneously illuminating a plurality of elemental areas of the image screen corresponding to successively scanned elemental areas of the field of view and changing the direction of propagation of said light beam for progressively changing the number of simultaneously illuminated elemental areas in a line while maintaining substantially constant the total number of simultaneously illuminated elemental areas.

18. A rotatable mirror drum having a plurality of reflecting faces positioned about an axis of rotation, the longitudinal axes of said faces being substantially parallel to said axis of rotation, the angular relationship between the plane of a reflecting face and a plane including the longitudinal axis of said reflecting face and the axis of rotation being different for different reflecting faces, respectively at least during the times that the mirror faces successively occupy a certain position with respect to the axis as the mirror faces are rotated about said axis.

19. Electro-optical image producing apparatus comprising a supersonic cell having a compressional wave propagating medium and a piezoelectric crystal for setting up compressional waves in said medium when suitably energized, a source of varying electromotive force the amplitude of which corresponds to the tone value of successively scanned elemental areas of a field of view for energizing said piezoelectric crystal and thereby cause to be propagated through said medium a compressional wave different portions of which are simultaneously representative of the tone value of different elemental areas of a field of view respectively, means for producing a light beam and directing it upon said supersonic cell, means for intercepting the undiffracted portion and transmitting a portion of the light beam which is diffracted due to the action of the compressional wave in the wave propagating medium, an image screen, means for producing upon the image screen an image of the supersonic cell or a portion thereof which image is enlarged in a direction corresponding to the direction of wave propagation through said medium and compressed in the direction at right angles to the first-mentioned direction, a light beam directed toward said screen being divergent in one plane and convergent in a plane perpendicular to the first plane, a rotatable mirror drum having a plurality of mirror faces positioned about an axis of rotation in the path of said light beam, different groups of said mirror faces being bounded by different pairs of planes perpendicular to the axis of rotation respectively, means for rotating said mirror drum about its axis to cause the mirror faces of each group to be moved successively into the light beam, the mirror faces being so inclined with respect to each other that mirror faces of different groups respectively alternately enter into the light beam and after having entered the light beam simultaneously reflect light to different lines respectively of the image screen, a second rotatable mirror drum in the path of said light beam having a plurality of mirror faces positioned about an axis of rotation in the path of said light beam, said mirror faces respectively having major axes parallel to the axis of rotation, said mirror faces lying in planes making different angles respectively with respect to planes including said axis of rotation and said major axes respectively during times that said mirror faces intercept and reflect said light beam, and means for rotating said second mirror drum about its axis of rotation at a rate which is fixed with respect to the rate of rotation of the first mirror drum for causing a group of lines of the image produced upon the viewing screen due to a complete revolution of the first mirror drum to be displaced upon the screen with respect to a group of lines produced due to a different complete revolution of the first mirror drum.

20. In a system for producing television images upon an image screen, a first movable means having surfaces for reflecting light incident thereon, said surfaces being movable about an axis, a second movable means having surfaces for receiving light from said first reflecting means and for reflecting light incident thereon to produce an image upon said image screen, means for moving the first reflecting means to produce a group of lines of an image during each complete revolution thereof while a surface of the second reflecting means which reflects incident light to the screen has a fixed inclination with respect to the screen, the inclination of the surfaces of the first movable means, respectively, with respect to said axis being such that light from said surfaces, respectively, trace different lines of said group, and means for moving said second light reflecting means to cause the production of different groups of lines of the image in succession by light reflected from said surfaces, respectively, of said second light reflecting means.

21. Apparatus for producing television images upon an image screen comprising a source of television image electromotive force produced as the result of scanning elemental areas of a field of view in succession along successive parallel lines, means for producing a light beam, means controlled by the electromotive force of said source for modulating said light beam to produce a modulated light beam different portions of which are simultaneously modulated in accordance with the tone values of different elemental areas respectively of a field of view, each of said portions being modulated in accordance with the tone values of successively scanned elemental areas, and means for directing said modulated light beam to illuminate simultaneously elemental areas of the screen lying along a plurality of different parallel lines.

22. Apparatus for producing television images upon an image screen comprising a source of television image electromotive force produced as the result of scanning elemental areas of a field of view in succession along successive parallel lines, means for producing a light beam, means controlled by the electromotive force of said source for modulating said light beam to produce a modulated light beam different portions of which are simultaneously modulated in accordance with the tone values of different elemental areas respectively of a field of view, each of said portions being modulated in accordance with the tone values of successively scanned elemental areas, and means for directing said modulated light beam to illuminate simultaneously elemental areas of the screen lying along a plurality of different parallel lines, the total number of elemental areas reproduced simultaneously being substantially equal to the number of elemental areas in a single scanning line during at least a major portion of the scanning time.

23. Apparatus for producing television images upon an image screen comprising a source of television image electromotive force produced as the result of scanning elemental areas of a field of view in succession along successive parallel lines, means for producing a light beam, means controlled by the electromotive force of said source for modulating said light beam to produce a modulated light beam different portions of which are simultaneously modulated in accordance with the tone values of different elemental areas respectively of a field of view, each of said portions being modulated in accordance with the tone values of successively scanned elemental areas, and means for directing said modulated light beam to illuminate simultaneously a plurality of elemental areas of the image screen lying along one line extending across the screen and a plurality of elemental areas lying along a different line parallel to the first.

24. In combination, a source of television image electromotive force produced as the result of scanning elemental areas in succession along parallel lines successively of a field of view an image of which is to be produced, means for producing a light beam, means comprising a supersonic cell in the path of said light beam for modulating the beam under control of the electromotive force of said source, an image screen and means for directing the modulated light beam upon said screen to illuminate simultaneously a plurality of elemental areas each at an intensity corresponding to the tone value of a corresponding elemental area of the field of view, the number of said simultaneously illuminated elemental areas being as large as the number of elemental areas in a single scanning line during at least a major portion of the scanning time.

25. Means for receiving and utilizing a single television image current produced as the result of scanning in succession parallel elemental strips of a field of view an image of which is to be produced, a light source, supersonic light valve means for modulating light from said source under control of said current, said valve means comprising a liquid wave-propagating medium and a vibratory element under control of said current for setting up a wave train in said medium, the successive amplitudes or intensities of the waves of which represent the light tone values of said field along the scanning path thereof for a distance many times as great as the width of said path, an image screen, and means for directing the light from said light valve to said screen to synthesize the image thereon in parallel elemental strips, said last-mentioned means comprising image forming means for imaging upon two parallel elemental strips on said screen two portions respectively of said light valve medium, said image forming means including stationary light converging means and moving light deflecting means which latter sweeps both said images onto, across, and off said screen at the same speed with one in advance of the other and at such rate that parts of said liquid medium which in turn are traversed by a wave therein are successively imaged on the same space on said screen, said one of said images being in advance of the other by such amount that at least a portion of the latter is on said screen at the time the former leaves said screen.

26. The method of utilizing a single video current representative of the light-tone values along a path over which an object field is scanned, said path being made up of parallel elemental strips of the field, to synthesize an image in corresponding parallel elemental strips on an image screen, which method comprises setting up, under control of said current, a series of mechanical waves modulated in accordance with the variations of said current, the amplitude pattern of said series progressively changing as new waves are formed, progressively illuminating with light rays controlled by said wave series a first elemental strip of the image screen in accordance with the light-tone values of the corresponding elemental strip of the object field, maintaining this illumination under control of said wave series without much decrease in intensity on each elemental portion of said strip for a period which is of the same length for each of the elemental portions of the strip, and repeating said two last-mentioned steps for each of the other elemental strips in succession with said step for illuminating beginning for each strip subsequently to the beginning of that for the preceding strip and during the period illumination on the preceding strip is maintained.

GERALD W. WILLARD.